Sept. 15, 1953          H. T. HODGES          2,652,209
FILM METERING MECHANISM
Filed May 27, 1950          2 Sheets-Sheet 1
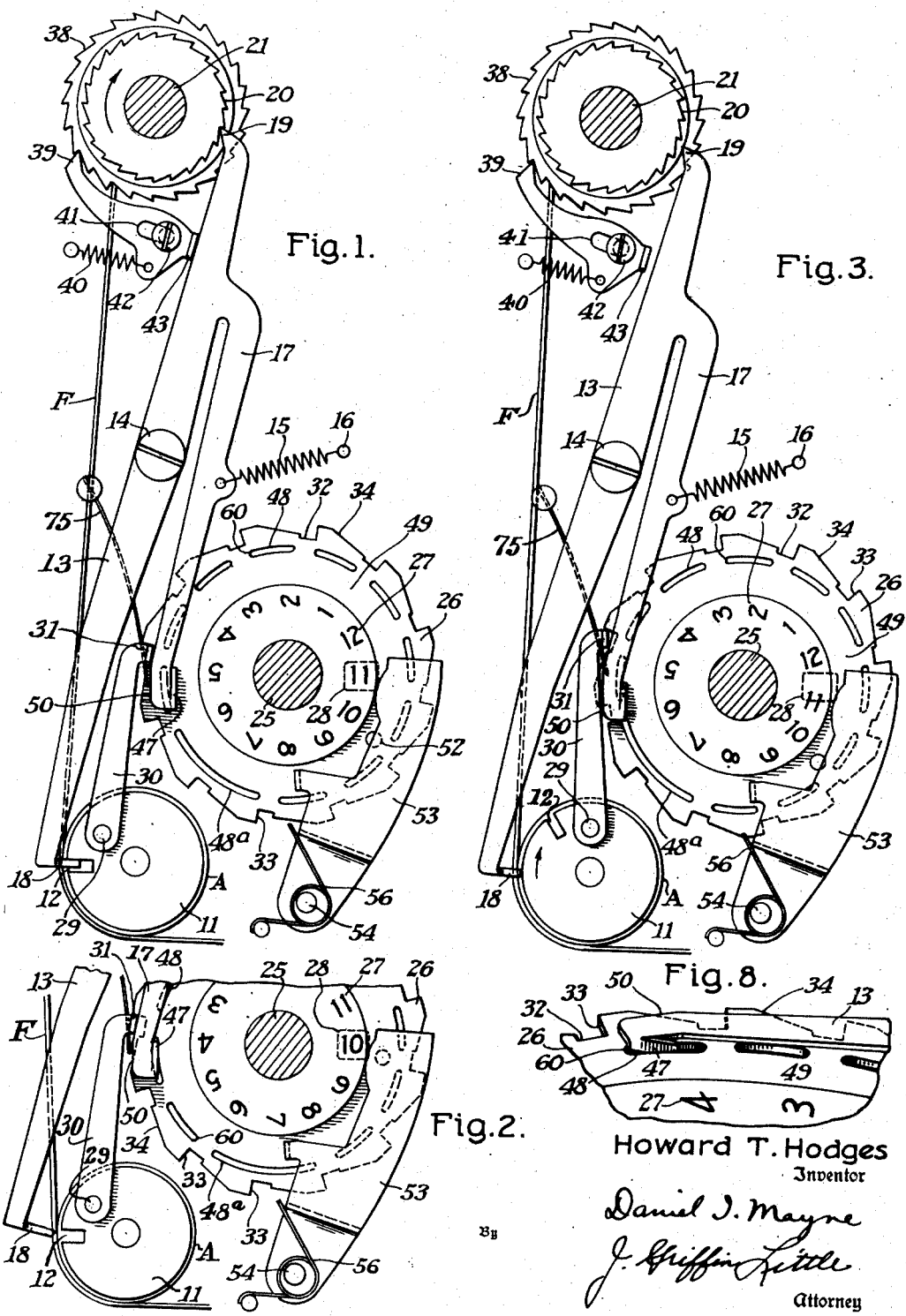
Howard T. Hodges
Inventor
Daniel J. Mayne
J. Griffin Little
Attorney Sept. 15, 1953  H. T. HODGES  2,652,209
FILM METERING MECHANISM
Filed May 27, 1950  2 Sheets-Sheet 2
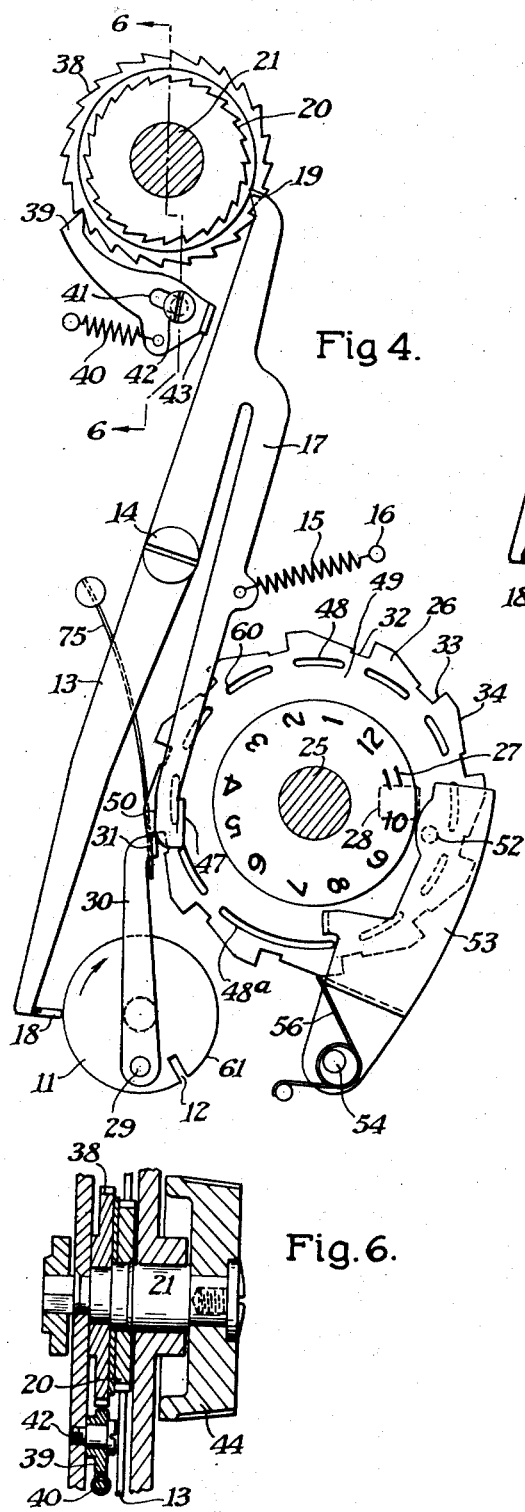
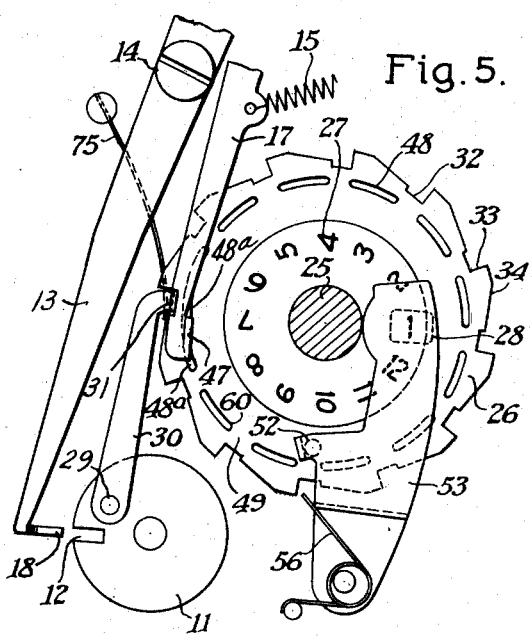
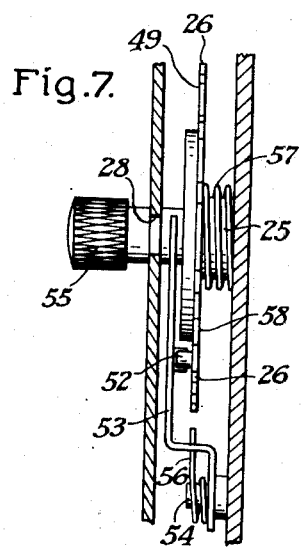
Howard T. Hodges
Inventor
Attorneys Patented Sept. 15, 1953

2,652,209

UNITED STATES PATENT OFFICE 2,652,209

FILM METERING MECHANISM

Howard T. Hodges, Rochester, N. Y., assignor to Eastman Kodak Company, Rochester, N. Y., a corporation of New Jersey Application May 27, 1950, Serial No. 164,787

20 Claims. (Cl. 242—71)

The present invention relates to roll film cameras and more particularly to a film-metering mechanism therefor.

As is well known, in cameras of this type, it is desirable to provide a mechanism which will lock the film-winding or moving means automatically after each exposure image has been wound onto the take-up spool or spindle and the unexposed frame or area has been moved into exposing position. After the exposure has been made, it is necessary to release the previously locked spindle so that the exposed area may be wound, as is well known. Furthermore, it is desirable to provide an arrangement by which the take-up spindle locking mechanism may be disengaged or rendered inoperative after the last exposure is made and wound up, so as to permit free winding of the trailer strip and the free winding of the leader strip of a new roll of film.

Accordingly, it is highly desirable to provide means for maintaining the elements of the locking mechanism in proper phased relation so as to lock the winding mechanism successively only after each exposure area is moved, and not to disconnect the locking mechanism from the film until after the last exposure area is wound up on the take-up spool or spindle. Also, it is desirable to provide an arrangement by which the parts of the control for the locking mechanism are locked after winding of the last exposure so as to insure the retention of the proper phased relation of the entire mechanism so that the parts will be in their proper relative positions when a new film is ready for exposure. To insure this result, the winding up of the last exposure serves directly both to lock the control parts in their proper phased relation, and to disconnect the parts from the film-measuring roll so that the trailer and leader strips may be wound freely without altering said phased relation. Then when the first image area of the new film is in position, the previously phased parts are connected to the measuring roll so as to be operated thereby and in timed relation therewith.

It is also highly desirable to provide means which effectively prevent accidental rotation of the counter dial between exposures. In addition, it is sometimes desirable to remove a partially exposed film strip from the camera. In order to accomplish this last result, it is essential that the unexposed areas be successively wound without further locking of the winding spindle. Also, such winding must be accomplished without changing the positions of the metering-mechanism parts so as to insure the proper phased relation when a new film is positioned in the camera. These desirable results are secured by the mechanisms of the present invention which will be hereinafter more fully described.

The present invention has as one of its objects a new, simple and effective way of releasing the holding pawl after an exposure is made.

Another object of the invention is the provision of an arrangement for temporarily retaining the holding pawl out of engagement with the metering disk so as to prevent inadvertent or premature locking of the winding spindle.

Yet another object of the invention is the provision of a single effective means for locking the parts in proper phased relation after the last exposed area is wound.

Still another object of the invention is the provision of a disengageable connection between the metering disk and the counter dial to permit independent movement of the latter.

To these and other ends the invention resides in certain improvements and combinations of parts, all as will be more fully described, the novel features being pointed out in the claims at the end of the specification.

In the drawings:

Fig. 1 is a plan view of the film-measuring mechanism constructed in accordance with the present invention, showing the parts in position to lock the film-winding spool at the end of a film-winding operation;

Fig. 2 is a partial view of the mechanism illustrated in Fig. 1, showing the relation of the parts just after the take-up spindle has been released;

Fig. 3 is a view similar to Fig. 1, but showing the relation of the parts after the holding pawl has been released and the film strip partially wound;

Fig. 4 is a view of the mechanism illustrated in Figs. 1 and 2, but at a later point in the film winding, showing the means by which the rotation of the metering disk is utilized to index the counter dial;

Fig. 5 is a partial view somewhat similar to Fig. 4, but showing the locked relation of the parts after the last exposure has been wound up;

Fig. 6 is a sectional view through the wind-up spindle, and taken substantially on the line 6—6 of Fig. 4, showing the relation of the parts;

Fig. 7 is a sectional view through the counter dial and its associated parts, showing the arrangement by which the dial may be moved axially to disconnect the dial from the metering disk for independent movement; and Fig. 8 is a partial perspective view of the counter dial, showing the annularly arranged notches or recesses, and the relation thereto of the holding lug on the locking pawl.

Similar reference numerals throughout the various drawings indicate the same parts.

As is common well known practice, a film strip is wound successively from a supply spool across an exposure area and is finally wound up on the take-up spool. During this passage across the camera, the film engages a measuring roll A which is rotated by and in timed relation with the movement of the film strip F. As such structures are well known and form no part of the present invention, they are not illustrated or described. However, the shaft of the measuring roll has mounted thereon a metering disk 11 which is of such a size as to make a single complete revolution when the film strip has been moved the distance of one image area, all of which is deemed apparent to those skilled in the art.

The disk 11 is formed with a radially-extending open-end slot or notch 12, the purpose of which will be later described. A locking or forward pawl 13 is pivoted at 14 on the camera. A spring 15 has one end anchored at 16 to the camera, and the other end fastened to an arm 17 formed from the material of pawl 13, as clearly shown in the drawings. The spring 15 tends to rock the pawl 13, with its arm 17, in a counter-clockwise direction, about pivot 14, to move a lug 18 on the left or lower end of the pawl into engagement with periphery of disk 11. The other or right end of pawl 13 is formed with a tooth 19 adapted to engage a ratchet 20 fixed to the take-up spindle 21 to lock the latter against further movement at the end of each film-winding operation. As mentioned above, disk 11 makes one revolution when the film strip is moved the distance of one image area. At this time the notch 12 has been moved into registry with the lug 18, and the pawl 13 rocks, under the action of spring 15, to move the lug 18 into notch 12. Such rocking simultaneously moves tooth 19 into locking relation with the ratchet 20 locking spindle 21 against further rotation, as shown in Fig. 1.

A stud 25 is rotatably mounted on the camera and has fixed thereto a counter dial 26 provided with annularly arranged designations or numerals 27 adapted to be positioned selectively in registry with an opening or window 28 formed in the camera body to indicate the number of exposures made. In order that the dial 26 may be operative to indicate the exposures, it is detachably connected to and actuated by the metering disk 11 so as to be moved in proper timed relation and sequence to the movement of the film strip. To secure this result, the disk 11 has eccentrically mounted thereon, by means of a pin 29, one end of a metering pawl 30, the other or free end of which is formed with a pawl 31 adapted to engage in peripherally spaced notches or recesses 32 formed on the dial 26. These notches 32 are so formed that the trailing edges thereof extend radially to provide shoulders 33, while the leading edges are tapered as shown at 34, for purposes to be later described. As the disk 11 makes one revolution for each film movement, a single reciprocation will be imparted to the metering pawl 30. Such reciprocation will cause the pawl 31 to engage in one of the notches 32 of the counter dial 26 to index the latter a distance of one numeral for each rotation of the metering disk. Thus, each time the film has been moved the distance of one image area, the counter dial is moved or indexed to bring the next number into position in registry with the window 28 to indicate the number of the exposure made. As the counter dial 26 is moved or indexed each time the film is moved, the dial may be broadly considered as an indexing mechanism. A spring 75 serves to hold pawl 31 in engagement with dial 26.

After the tooth 19 engages ratchet 20, as above described, the film is ready for an exposure, and the shutter may be operated to expose the positioned film area. After making the exposure, it is now necessary to wind up the exposed film. It is noted, however, that the parts are in the position shown in Fig. 1, and the take-up spindle is locked. Therefore, it is necessary to move the tooth 19 of the pawl 13 out of holding relation with the ratchet 20 before the exposed film can be wound up. Obviously, this can be accomplished by imparting a clockwise rotation to the pawl 13. Such rotation will not only disengage tooth 19 from ratchet 20 to free the spindle 21, but also will withdraw the lug 18 out of the notch 12 of the disk 11 to free the latter and its connected counter dial 26.

While a plurality of arrangements may be utilized to impart such clockwise rotation to pawl 13, the present invention secures such rotation by means of a reverse rotation of the winding spindle so that the latter not only serves to wind up the film when rotated in one direction, but also to release the holding pawl 13 when rotated in the opposite direction. In winding the film, the spindle 21 is rotated in a clockwise direction, as indicated by the arrow in Fig. 1. When, however, the pawl 13 is to be disengaged from the spindle 21, the latter is rotated in the opposite or counter-clockwise direction. In order that the spindle may be effectively released, the spindle has mounted thereon a second ratchet 38 which is engaged by a releasing pawl 39, held in engagement with ratchet 38 by means of a spring 40. The pawl 39 is formed with a slot 41 to mount the pawl 39 slidably on a stud 42 which extends through slot 41. When the pawl 13 is in locked relation with the ratchet 20, an ear 43 on the lower end of the releasing pawl 39 is in substantial engagement with pawl 13, see Fig. 1. Now, after the exposure has been made, the spindle 21 is rotated, by means of a knob 44, in a counter-clockwise direction. Such movement causes ratchet 38 to engage pawl 39 to slide the latter to the right as viewed in Fig. 1 and into positive engagement with pawl 13. Further rotation of the spindle will cause ear 43 to rock pawl 13 clockwise about the pivot 14 to disengage tooth 19 from ratchet 20, and simultaneously withdraw lug 18 from notch 12. The parts are then in the position shown in Fig. 2.

While the spindle 21 is now unlocked, it is apparent that if knob 44 is now released, the spring 40 will return pawl 39 to its original position to free pawl 13. Spring 15 will then become operative again to rock pawl 13 in a counter-clockwise direction and back to the position shown in Fig. 1 to again lock the spindle. Therefore, it is apparent that when the spindle has been turned to release the pawl 13, some means must be provided to retain the latter in its released position.

To secure this result, the pawl 13 has formed from the material thereof auxiliary cantilever arm 17 which is arranged alongside of pawl 13, but is shorter than the latter. The free end of arm 17 is formed with a downturned lug 47. Now, when the pawl 13 is rocked in a clockwise direction, as above described, the lug 47 of arm 17 moves radially outward or to the left across the face 49 of dial 26, and finally drops into a registering recess 48, shown in Figs. 2 to 4 and 8. Such movement serves to bring a surface 50 of arm 17 into engagement with pawl 31 to rock the latter about pin 29 to move the pawl 31 out of the peripheral notch 32 on dial 26, as shown in Fig. 3, to disconnect the counter dial 26 from disk 11. While the pawl 31 is withdrawn from notch 32, it still lies behind the shoulder 33, see Fig. 2, so that the dial 26 cannot rotate inadvertently in a counter-clockwise direction.

As the spindle 21 is now rotated, the exposed film is moved across the camera and wound upon the take-up spool. Such film movement will impart a clockwise movement to disk 11 to draw pawl 31 downwardly, as viewed in Figs. 1–5, such movement being possible by reason of the tapered edges 34 of notches 32. This movement is continued until the pawl 31 finally drops into the next notch 32. Further rotation of disk 11 will then cause pawl 31 finally to move upwardly to exert pressure on shoulder 33 of the engaged notch to impart a clockwise rotation to the counter dial 26. This rotation is continued until disk 11 and dial 26 are moved to a position slightly beyond that illustrated in Fig. 4. When this point is reached, the lug 47 reaches the end of the engaged recess 48, and the trailing edge 60 of the recess serves to cam the lug 47 out of the recess to free the arm 17 and hence pawl 13. Spring 15 then becomes operative to impart a slight counter-clockwise rotation to pawl 13 to move lug 18 into engagement with a periphery 61 of the disk 11 substantially as illustrated in Fig. 4. Further rotation of disk 11 by the film will finally bring the notch 12 into registry with lug 18 which will then move into the notch under the action of spring 15 to move tooth 19 into locking relation with ratchet 20 to stop further movement. Thus, not only is the spindle 21 locked, but, by reason of the engagement of lug 18 in notch 12, the disk 11 and dial 26 are also held against rotation, thus locking the entire mechanism.

By means of the above structure, the spindle 21 is locked automatically at the end of each winding operation. Before the film may again be moved, the pawl 13 must be moved to its released or unlocked position. Such movement causes lug 47 to engage in one of the recesses 48 to hold the pawl 13 in its released position and with the lug 18 withdrawn from notch 12. This locking, releasing and winding continues until the last image or frame is reached. After the twelfth exposure is made and wound, and the spindle unlocked as above described, the lug 47 is positioned finally in the elongated slot 48a which is similar to the slots 48, but differs therefrom only in that it is twice as long as slots 48 and corresponds to exposures 12 and 1. When this point is reached, rotation of dial 26 finally moves a lug 52 thereon into engagement with a window cover 53 pivoted at 54 on the camera. Such engagement causes cover 53 to move counter-clockwise about pivot 54 to a position under window 28, as shown in Fig. 5, to block the latter to obstruct the numeral position and registry thereof. Such movement continues until the cover finally engages the stud 25 which limits further movement of the cover 53 and also locks dial 26 and disk 11 in a fixed phased relation. The parts are then in the position shown in Fig. 5. At this time, dial 26 has been moved to bring numeral "1" thereon into registry with the window 28. As the take-up spindle is free, the latter may be rotated to wind up the trailer strip.

When a new film roll is placed in the camera, the leader strip is wound up until the numeral "1" on the backing paper comes into view in the window at the back of the camera. When this point is reached, the film is in position for its first exposure. However, cover 53 still covers window 28 so that the numerals cannot be seen. Also, dial 26 and disk 11 are still locked in a fixed phased relation. It is now necessary to move cover 53 to its inoperative position to release dial 26 and disk 11. To secure this result, a finger knob 55, connected to dial 26, is pressed downwardly or to the right, as viewed in Fig. 7, to move lug 52 and dial 26 as a unit axially and out of engagement with cover 53 to free the latter. A coil spring 56 then serves to rock cover 53 in a clockwise direction about its pivot 54 and out of blocking position with window 28. The numeral "1" on the dial 26 now appears in window 28 to indicate that the first film area is in position. The downward movement of dial 26 also serves to move the notch or recess 48a out of holding relation with lug 47 to free the pawl 13. The latter now moves in a counter-clockwise direction, under the action of spring 15, to move lug 18 into notch 12 and tooth 19 into engagement with ratchet 20 to lock the spindle 21, as well as disk 11 and dial 26. Also when the dial 26 is thus moved downward the pawl 30 is disconnected from dial 26 to disconnect the latter from disk 11. A coil spring 57 wrapped about stud 25 engages the under surface 58 of dial 26 and serves to move the latter upwardly or to the left, as viewed in Fig. 7, when the knob 55 is released to return the dial 26 to its initial or operative position with numeral "1" under window 28.

It is sometimes desirable, for various reasons, to remove a partially exposed roll from the camera and to replace it with a new roll. In order to remove such a partially exposed roll, obviously it is necessary to wind up the unexposed areas onto the take-up spindle. Such winding may be accomplished in the step-by-step manner described above, but without making exposures after each film movement. However, the structure of the present invention enables such winding to be performed easily and quickly. All that is necessary is to rock the spindle 21 counter-clockwise to release pawl 13, as above described. Such unlocking also frees dial 26. With the spindle held in its releasing position by pressing on knob 55, the dial 26 may be spun clockwise independently of disk 11 until the dial reaches the position shown in Fig. 5. At this time, dial 26 and disk 11 are locked in proper phased relation, and the pawl 13 is maintained in its freed position. The knob 44 and spindle 21 may now be rotated freely to wind off the unexposed areas as well as the trailing strip. This independent rotation of the dial 26 thus allows a partially exposed roll to be wound off without further locking of the winding spindle, and leaves the metering mechanism and its associated parts in proper phased relation to receive a new roll.

If, later, it is desired to replace the partially exposed roll in the camera, it is necessary to wind off the previously exposed areas before an exposure is made. One way of doing this is to wind the film until the proper numeral on the backing paper appears in the viewing window. Of course, the counter dial 26 may not necessarily correspond to the number on the backing paper. The dial may then be adjusted by pressing on the knob 55 and spinning dial 26 until the proper numeral thereon appears through window 28. Obviously, however, it is difficult to position the numerals 27 on dial 26 with sufficient accuracy so as to insure the accurate positioning of the metering mechanism in proper relation to the film. The preferred method is to move the film until numeral "1" on the backing paper appears in the window at the back of the camera. The pawl 13 is then released in the manner above described. The film is then successively advanced, locked and released, but without making exposures, until the proper number on the backing paper appears in the viewing window at the back of the camera. This step-by-step movement of the film serves to rotate the disk 11 and dial 26 in the proper relation to the film movement, so that when the latter has been moved to the desired point, the disk 11 and dial 26 will be in proper phased relation and in proper position relative to the film, and the correct number will appear in window 28. This latter method thus insures the proper positioning of the parts, and the desired functioning on the subsequent film movement.

The present invention thus provides a new and improved film-metering mechanism which effectively locks the spindle at the end of each winding operation. The spindle is released by means controlled directly by the spindle itself. The film movement serves to adjust a counter dial so that the latter will hold the locking pawl in a released position during the initial portion of the film-winding opertaion after which the pawl is released so that it may become operative again to lock the winding spindle at the completion of the winding operation. The metering mechanism is locked automatically in proper phased relation not only at the end of each winding operation, but also when the last exposure is wound. The result is that when a new film is placed in the camera, the mechanism may be unlocked and is in proper position relative to the film. The mechanism of the present invention permits the winding off of a partially exposed roll without further locking of the spindle and without interfering with the proper phased relation of the various mechanisms.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a roll film camera, the combination with a camera body, a rotatable take-up spindle mounted on said body and adapted to be rotated in one direction to wind up a film strip after each exposure, a ratchet carried by said spindle, a movable pawl, a rotatable disk positioned on said body and rotated by said strip and in timed relation therewith, of means controlled directly by said disk to permit said pawl to move into locking relation with said ratchet when a predetermined length of film has been wound, means actuated by said spindle for moving said pawl out of locking relation with said ratchet, and means on said disk for holding said pawl out of locking relation.

2. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk formed with a peripheral notch positioned on said body and rotated by said strip and in timed relation therewith, of a lug on said pawl movable into the notch of said disk to move said pawl into locking relation with said ratchet when a predetermined length of film has been wound, means actuated by rotation of said spindle in the opposite direction to move said lug out of said notch and simultaneously to move said pawl out of locking relation with said ratchet, and means controlled by said disk for holding said pawl out of locking relation with said ratchet.

3. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk formed with a peripheral notch positioned on said body and rotated by said strip and in timed relation therewith, of a lug on said pawl movable into the notch of said disk to move said pawl into locking relation with said ratchet when a predetermined length of film has been wound, and a releasing pawl slidably mounted on said body and connectable both to said spindle and said movable pawl, the rotation of said spindle in the opposite direction serving to move said releasing pawl to shift said movable pawl to move said lug out of said notch and simultaneously to move said movable pawl out of locking relation with said ratchet to free said spindle.

4. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk formed with a peripheral notch positioned on said body and rotated by said strip and in timed relation therewith, of a lug on said pawl movable into the notch of said disk to move said pawl into locking relation with said ratchet when a predetermined length of film has been wound, a releasing pawl slidably mounted on said body and connectable both to said spindle and said movable pawl, and spring means for moving said releasing pawl in one direction to connect said releasing pawl to said spindle, the rotation of said spindle in the opposite direction serving to move said releasing pawl to shift said movable pawl out of locking relation with said ratchet to free said spindle.

5. In a roll film camera, the combination with a camera body, a rotatable take-up spindle mounted on said body and adapted to be rotated in one direction to wind up a film strip after each exposure, a ratchet carried by said spindle, a movable pawl, a notched rotatable metering disk positioned on said body and rotated by said strip and in timed relation therewith, of a lug on said pawl movable into the notch of said disk to move said pawl into locking relation with said ratchet when a predetermined length of film has been wound, a releasing pawl slidably mounted on said body and connectable both to said spindle and said movable pawl, spring means for moving said releasing pawl in one direction to connect said releasing pawl to said spindle, the rotation of said spindle in the opposite direction serving to move said releasing pawl to shift said movable pawl out of locking relation with said ratchet to free said spindle, and means controlled by said disk for holding said movable pawl out of engagement with said ratchet until a definite length of film has been wound.

6. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled directly by said disk to permit said pawl to move into locking relation with said ratchet when a predetermined length of film has been wound, means actuated by the rotation of said spindle in the opposite direction to shift said pawl out of locking relation with said ratchet, means on said dial cooperating with said pawl to hold the latter out of locking relation with said ratchet and out of operative relation with said disk, and means for releasing said holding means to allow said pawl to cooperate with said disk so as to render the latter operative to move the pawl into locking relation with said ratchet when a predetermined length of film has been wound.

7. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled directly by said disk to permit said pawl to move into locking relation with said ratchet when a predetermined length of film has been wound, means actuated by the rotation of said spindle in the opposite direction to shift said pawl out of locking relation with said ratchet, a plurality of annularly arranged recesses formed on said dial, and a locking lug formed on said pawl and adapted to engage in one of said recesses when said pawl is moved out of locking relation with said ratchet to hold said pawl out of operative relation with said disk.

8. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled directly by said disk to permit said pawl to move into locking relation with said ratchet when a predetermined length of film has been wound, means actuated by the rotation of said spindle in the opposite direction to shift said pawl out of locking relation with said ratchet, a plurality of annularly arranged recesses formed on said dial, a locking lug formed on said pawl and adapted to engage in one of said recesses when said pawl is moved out of locking relation with said ratchet to hold said pawl out of operative relation with said disk, means on said dial for moving said lug out of the said one notch to release said pawl, and means for moving the released pawl into operative relation with said disk.

9. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of mean controlled directly by said disk to permit said pawl to move into locking relation with said ratchet when a predetermined length of film has been wound, means actuated by the rotation of said spindle in the opposite direction to shift said pawl out of locking relation with said ratchet, a plurality of annularly arranged recesses formed on said dial, a locking lug formed on said pawl and adapted to engage in one of said recesses when said pawl is moved out of locking relation with said ratchet to hold said pawl out of operative relation with said disk, cam means on said dial associated with said one notch for camming the lug out of the cooperating notch when the pawl is shifted out of engagement with said ratchet to free said pawl, and means for moving said pawl relative to said body to shift said lug out of registry with said one notch and simultaneously to move said pawl into operative relation with said disk.

10. In a roll film camera, the combination with a camera body, a rotatable take-up spindle mounted on said body and adapted to be rotated in one direction to wind up a film strip after each exposure, a ratchet carried by said spindle, a movable pawl rockably mounted on said body, a rotatable metering disk formed with a peripheral notch and positioned on said body and rotated by said strip and in timed relation therewith, a rotatable counter dial, means for operatively connecting said dial to said disk to be actuated thereby, of a lug formed on one end of said movable pawl adapted to move into said notch to rock said movable pawl when a predetermined length of film has been wound, the movement of said movable pawl serving to move the other end thereof into locking relation with said spindle to prevent further movement thereof, a releasing pawl slidably mounted on said body adjacent said other end and engaging said ratchet so that movement of said spindle in the opposite direction will slide said releasing pawl into engagement with said movable pawl to rock the latter to move said one end out of locking relation with said ratchet to free said movable pawl and simultaneously to move said lug out of said notch to free said disk, said dial being formed with a plurality of annularly arranged recesses, a holding lug formed on said movable pawl and adapted to engage in one of said recesses when said movable pawl is moved out of locking relation with said ratchet, the rotation of said disk by said film serving to rotate said dial to move said one notch out of holding relation with said first lug, and a spring for rocking said movable pawl to move said holding lug out of the path of said recesses and simultaneously to move said first lug into engagement with said disk so that when the latter is rotated sufficiently to bring the notch therein into registry with said first lug the latter will move into said notch to rock said first pawl to move the other end of the latter into locking relation with said ratchet.

11. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled by said disk to permit said pawl to move into locking relation with said ratchet when a predetermined length of film has been wound, manually controlled means for releasing said pawl from said ratchet to permit the rotation of said spindle to wind said strip, means associated with said dial for retaining said pawl in its released position, and means for disconnecting said dial from said disk to permit independent rotation of said dial.

12. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled by said disk to permit said pawl to move into locking relation with said ratchet when a predetermined length of film has been wound, manually controlled means for releasing said pawl from said ratchet to permit the rotation of said spindle to wind said strip, means associated with said dial for retaining said pawl in its released position, means for disconnecting said dial from said disk to permit independent rotation of said dial, and means to lock said dial automatically against further rotation when said dial has been moved a predetermined distance.

13. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled by said disk to permit said pawl to move into locking relation with said ratchet when a predetermined length of film has been wound, manually controlled means for releasing said pawl from said ratchet to permit the rotation of said spindle to wind said strip, means associated with said dial for retaining said pawl in its released position, said dial being provided with a plurality of peripheral notches engageable by said connecting means to actuate said dial from said disk, and means to disconnect said dial from said disk to permit limited rotation of said dial independently of said disk, when said dial has been independently moved a predetermined distance said connecting means and notches cooperating automatically to prevent further independent movement of said dial.

14. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled by said disk to permit said pawl to move into locking relation with said ratchet when a predetermined length of film has been wound, manually controlled means for releasing said pawl from said ratchet to permit the rotation of said spindle to wind said strip, means for retaining said pawl in its released position, means for disconnecting said dial from said disk to permit limited rotation of said dial independently of said disk, and cooperating means on said dial and said connecting means to limit the independent rotation of said dial.

15. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled by said disk to permit said pawl to move into locking relation with said ratchet when a predetermined length of film has been wound, manually controlled means for releasing said pawl from said ratchet, means to disconnect said dial completely from said connecting means to free said dial to permit rotation of the latter independently of said disk, and cooperating means on said dial and connecting means to arrest said independent rotation when said dial has been rotated a predetermined amount.

16. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled by said disk to permit said pawl to move into locking relation with said ratchet when a predetermined length of film has been wound, and manual control means for disconnecting said dial completely from said disk to permit uninterrupted independent rotation of said dial.

17. In a roll film camera, the combination with a camera body, a rotatable metering disk positioned on said body and operatively connected to and rotated by a film strip being moved in said camera, a dial rotatably mounted on said camera, means for operatively connecting said disk to said dial so that the latter will be rotated in timed relation to the movement of the film strip, of a member rockably mounted on said camera adjacent said dial, means on said dial adapted to engage and rock said member after the last exposure has been made, and stop means for limiting the rocking of said member to lock said dial and disk in a definite relative and phased relation.

18. In a roll film camera, the combination with a camera body, a rotatable metering disk positioned on said body and operatively connected to and rotated by a film strip being moved in said camera, a rotatable counter dial mounted on said camera and provided with annularly arranged exposure indications selectively viewable through an opening in said camera, means for operatively connecting said disk to said dial so that the latter will be operated in timed relation to the film movement so as to bring said indications successively into registry with said opening to indicate the number of exposures made, of a member pivotally mounted on said body adjacent said dial and having a portion movable between said opening and said indications to obscure the latter, and means on said dial arranged to engage and move said member into obstructing position after the last exposure is wound and simultaneously to lock said dial and disk in a definite phased relation.

19. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled directly by said disk to permit said pawl to move into locking relation with said ratchet when a predetermined length of film has been wound, means for moving said pawl out of locking relation with said ratchet, means independent of said disk and connecting means for disconnecting said dial completely from said disk and said connecting means and for indexing said dial when said pawl is released, and means for automatically reengaging said pawl and ratchet after each indexing to prevent further indexing until the pawl is again released.

20. In a roll film camera, the combination with a camera body, a rotatable take-up spindle mounted on said body and adapted to be rotated in one direction to wind up a film strip after each exposure, a ratchet carried by said spindle, a movable pawl, a rotatable metering disk positioned on said body and rotated by said strip and in timed relation therewith, a rotatable counter dial, means for operatively connecting said dial to said disk to be actuated thereby, of means controlled directly by said disk to permit said pawl to move into locking relation with said ratchet when a predetermined length of film has been wound, means actuated by rotation of said spindle in the opposite direction to move said pawl out of locking relation with said ratchet, means for indexing said dial a predetermined amount independently of said disk and connecting means to permit positioning of said dial independently of movement of the film strip, and means controlled by said dial for permitting said pawl to reengage said ratchet after said dial has been indexed.

HOWARD T. HODGES.

References Cited in the file of this patent

UNITED STATES PATENTS

| Number | Name | Date |
|---|---|---|
| 2,063,331 | Nagel | Dec. 8, 1936 |
| 2,356,560 | Baumgartner | Aug. 22, 1944 |